United States Patent Office 3,525,450
Patented Aug. 25, 1970

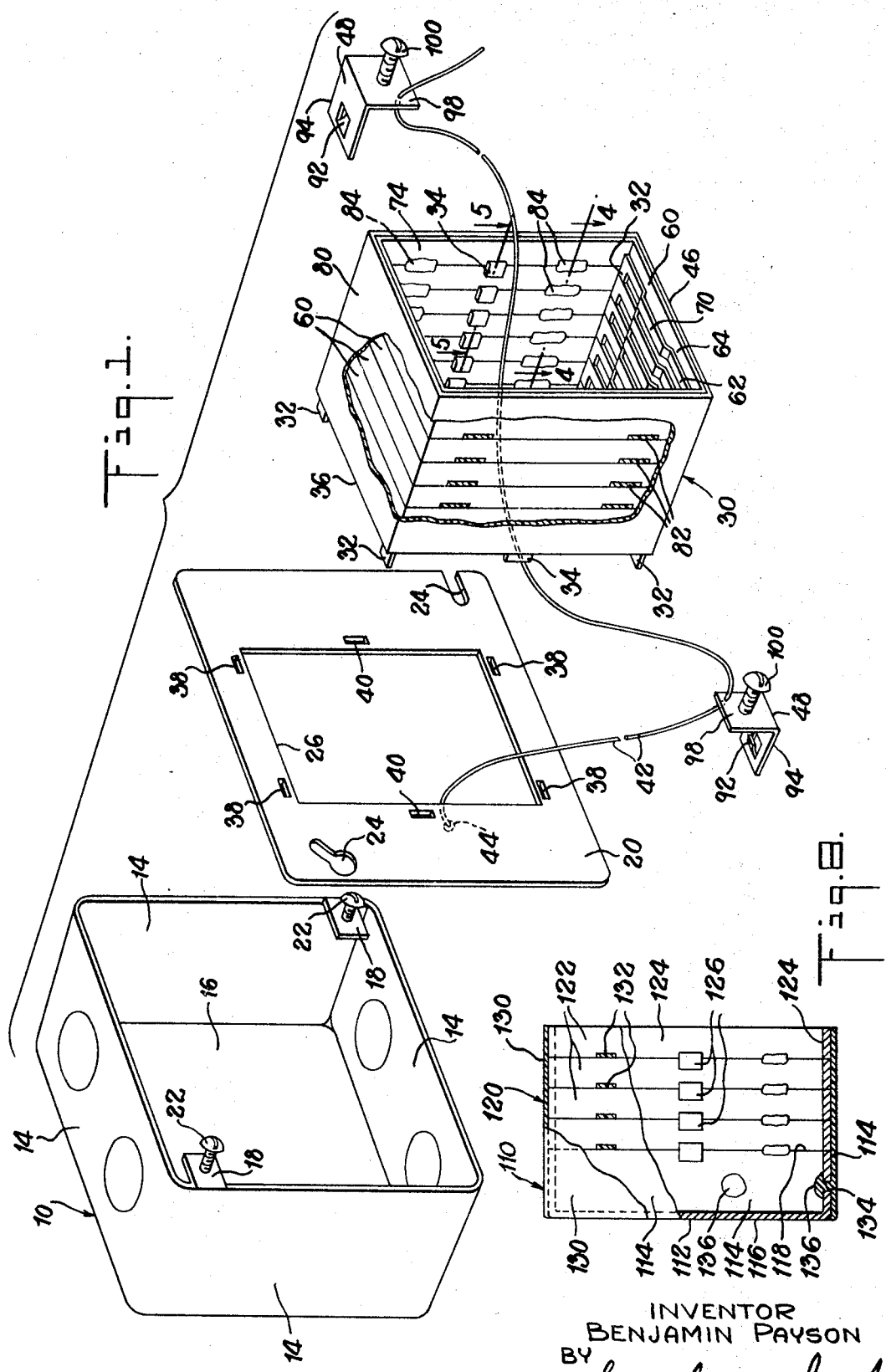

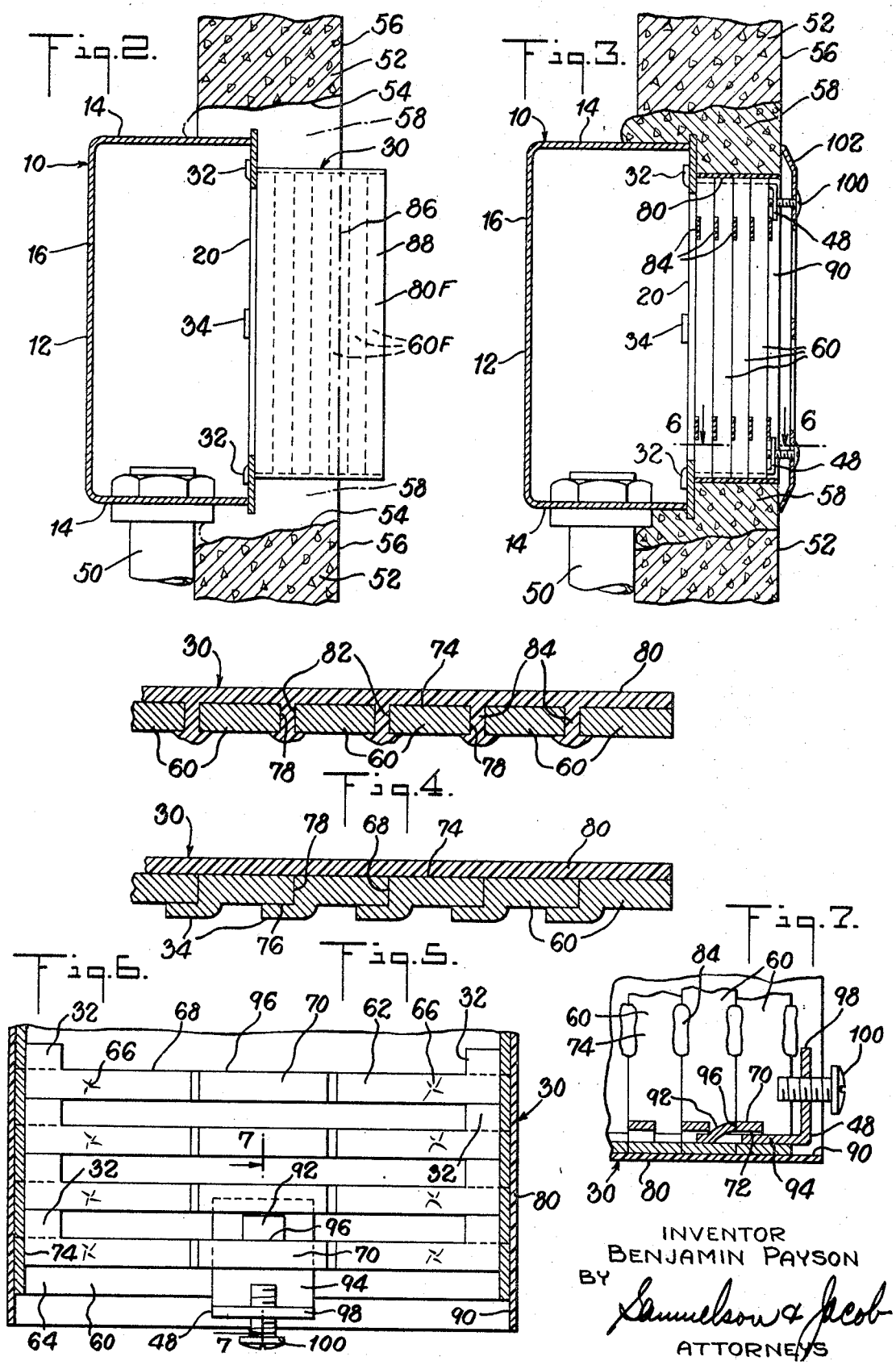

3,525,450
ELECTRICAL BOX COVER CONSTRUCTION
Benjamin Payson, East Brunswick, N.J.
(304 S. 2nd Ave., Highland Park, N.J. 08904)
Filed Dec. 23, 1968, Ser. No. 786,160
Int. Cl. H02g 3/08
U.S. Cl. 220—3.7      10 Claims

ABSTRACT OF THE DISCLOSURE

An electrical box cover construction including a sleeve in which a plurality of sleeve-like sections are arranged end-to-end within a sheath of plastic material which cooperates with the sections such that the sheath may be severed flush with the surface of a surrounding structure within which the electrical box is installed to remove that portion of the sheath extending outwardly beyond the surface of the surrounding structure and any sections corresponding to that portion of the sheath and render the open end of the sleeve flush with the surface of the surrounding structure.

---

The present invention relates generally to receptacles which are installed within building structures and pertains, more specifically, to electrical box covers which provide an opening into the electrical box with which such covers are associated and which enable the opening to be made flush with the surface of a wall, floor or ceiling in which the electrical box is installed.

Ordinarily, receptacles such as electrical outlet boxes are installed during the erection of buildings and partitions by first fastening the receptacle or box to a stud or beam and then bringing the surface of the finished wall, ceiling or floor up to the edges of the opening in the box, the construction of the wall, ceiling or floor being made up of any one of several conventional materials such as dry wallboard, plaster, or masonry in the form of concrete, brick, tile or building blocks.

In installations in masonry, often the electrical outlet box is not supported upon studs or beams but is merely held in place within an opening the brick, tile, block or concrete wall, floor or ceiling by a rigid conduit leading to the box. Such openings are not cut with any precision and are usually larger than the box, requiring that a mason fill with mortar, or the like, the voids between the box and the opening within which the box is held. In so doing, it is important to keep the mortar out of the opening to the box and at the same time assure that in the completed installation, the wall, floor or ceiling surface will be flush with the opening to the receptacle or box.

It is therefore an important object of the invention to provide a receptacle or electrical outlet box in which the construction at the opening thereof allows the opening to be made flush with the surface of the surrounding structure in which the receptacle or box is installed.

Another object of the invention is to provide a construction in a receptacle or in a cover for an electrical outlet box which includes a sleeve which is to be located in the wall, floor or ceiling in which the receptacle or box is to be installed and which includes means for selectively adjusting the length of the sleeve after installation to render the outermost edge of the sleeve flush with the surface of the wall, floor or ceiling, particularly where the wall, floor or ceiling is a masonry structure.

A further object of the invention is to provide a sleeve of the type described and which serves as a retaining wall against which masonry material such as mortar may be troweled during finishing of the masonry structure and which will preclude such mortar from entering the opening to the receptacle or electrical box and subsequently may readily be made flush with the surface of the structure.

A still further object of the invention is to provide a simple yet effective raised outlet cover for electrical outlet boxes in which the opening to the outlet box may be made flush with the surface of the structure within which the electrical outlet box is installed subsequent to installation with a minimum of effort.

The above objects as well as further objects and advantages are attained by the invention which may be described briefly as providing in a receptacle having an opening, the edge of which opening is to be flush with the surface of the surrounding structure within which the receptacle is to be located, a sleeve extending from a rearmost end to a forwardmost end adjacent the opening, the sleeve comprising a plurality of sleeve-like sections arranged longitudinally in end-to-end relationship between the ends of the sleeve and including at least one forwardmost section adjacent the opening, and a sleeve-like layer of plastic material coextensive with the sections and cooperating with the sections such that the sleeve-like layer may be severed flush with the surface of the surrounding structure to remove the forwardmost portion of the layer extending forward of the surface of the surrounding structure and any sections which correspond to the forwardmost portion of the layer and which extend forward of the surface of the surrounding structure and render the opening flush with the surface of the surrounding structure.

The invention will be more fully understood while still further objects and advantages will be made apparent in the following detailed description of preferred embodiments of the invention illustrated in the accompanying drawing, in which:

FIG. 1 is an exploded perspective view of an electrical outlet box constructed in accordance with the invention;

FIG. 2 is a cross-sectional, elevational view illustrating the electrical outlet box of FIG. 1 placed within an opening in a masonry wall;

FIG. 3 is a cross-sectional, elevational view similar to FIG. 2, but illustrating a completed installation;

FIG. 4 is an enlarged, fragmentary cross-sectional view taken along line 4—4 of FIG. 1;

FIG. 5 is an enlarged fragmentary cross-sectional view taken along line 5—5 of FIG. 1;

FIG. 6 is an enlarged, fragmentary cross-sectional view taken along line 6—6 of FIG. 3;

FIG. 7 is a fragmentary, cross-sectional view taken along line 7—7 of FIG. 6; and FIG. 8 is a partially sectioned elevational view of a receptacle constructed in accordance with the invention.

Referring now to the drawing, and particularly to FIG. 1, an electrical outlet box 10 is seen to have a body 12 which includes side walls 14 and a closed bottom 16. A pair of tabs 18 project inwardly from the side walls at the opening to the box so as to receive a cover plate 20 which may be placed over the opening and seated upon the tabs 18 to close the body 12 of the box. A pair of screws 22 will then extend through corresponding slots 24 in the cover plate 20 to fasten the cover plate in place. The cover plate 20 itself has an opening 26 for providing access into the outlet box and a sleeve 30 is attached to the cover plate 20 to establish a raised cover for purposes which will be more fully described below. In use, the sleeve 30 is affixed to the cover plate 20 by means of a plurality of tabs 32 and 34 which project rearwardly from the rearmost end 36 of the sleeve and enter corresponding slots 38 and 40 in the cover plate 20. A ground wire 42 is affixed to the cover plate at 44 and extends through the sleeve 30 to be brought through the opening at the forwardmost end 46 of the sleeve 30. The ground wire 42 passes through a pair of clips 48 which may be located adjacent the opening at the forwardmost end 46 of the sleeve 30 in a manner which will be explained below.

Turning now to FIG. 2, the electrical outlet box 10 is shown with the cover plate 20 in place thereon and with the sleeve 30 affixed to the cover plate by means of the tabs 32 and 34 which have been passed through the corresponding slots in the cover plate and bent over at a right angle to secure the sleeve to the cover plate. The electrical outlet box 10 is supported by means of a rigid conduit 50 which passes through one wall 14 thereof and is affixed thereto, and is held in place with respect to a masonry wall 52 such that the sleeve 30 passes through an opening 54 in the wall 52. The opening 54 in the wall 52 has been cut somewhat larger than the electrical outlet box, and the sleeve 30 and cover plate 20 serve as a raised cover which brings the opening to the interior of the electrical outlet box beyond the surface 56 of the masonry wall 52. After thus locating the electrical outlet box with respect to the masonry wall, the wall may be patched by placing mortar 58 within the space between the opening 54 in the wall 52 and the corresponding portions of the electrical outlet box including the raised cover. The mortar 58 may be troweled in so that the outer surface 56 of the wall is brought right up to the outer surface of the sleeve 30 (see FIG. 3).

The sleeve 30 is made up of a plurality of sleeve-like sections 60 arranged in end-to-end relationship between the ends 36 and 46 of the sleeve. Each section 60 is rectangular and is preferably formed of metal. As best seen in FIGS. 1, 6 and 7, each section is provided with a pair of metal strap members 62, each affixed to one of opposite sides 64 of a rectangular section, preferably by spot welding as shown at 66. Each strap member 62 has a pair of protrusions which project rearwardly and extend beyond the rear edge of the section thus providing the tabs 32 projecting from the rear edge 68 of each section essentially at the corners of the section. The central portion 70 of each strap member 62 is raised to provide a channel 72 for purposes which will be described hereinafter.

Approximately midway between the shorter sides 64 of the rectangular sections 60 there is located on each longer side 74 of the rectangular section further protrusions providing the tabs 34 which project rearwardly from the rear edge 68 of each section. When the sections 60 are brought into end-to-end relationship, the sections are maintained in proper longitudinal registration with respect to one another along a longitudinal axis which will extend generally perpendicular to the opening to the box 10 by virtue of the tabs 32 and 34 of one section overlapping corresponding portions 76 adjacent the forward edges 78 of the next adjacent section (see FIG. 5). In most instances, tabs 32 are sufficient to maintain longitudinal alignment of the sections and tabs 34 may be eliminated for economy of manufacture; however, tabs 34 do aid in keeping longer sides 74 in proper registration.

All of the sections are held in such assembled relationship by means of a sleeve-like layer of plastic material shown in the form of a sheath 80 which is coextensive with the sections 60 and cooperates with the sections such that the outer surfaces of the sections are surrounded by the sheath. Although the engagement of the sheath with the outer surfaces of the sections is sufficient in itself to hold all of the sections in place within the sleeve, additional means are advantageously provided for more positively locking each section in place within the sheath. As best seen in FIGS. 1, 3 and 4, each section 60 is provided with a notch 82 establishing a transverse surface portion adjacent the rear edge 68 of the section and the plastic material of the sheath 80 is made to pass through each notch 82 such that the sleeve 30 is provided with passages passing transversely into the sections at each juncture between adjacent sections and laterally extending projections 84 of the plastic sheath 80 will lock each section 60 in place within the assembled sections to establish an integral sleeve 30 made up of a plurality of sections covered with a sheath of plastic material.

Returning now to FIGS. 2 and 3, once the mortar 58 has been troweled into the space between the opening 54 in the masonry wall 52 and the sleeve 30, the sheath 80 may be cut with a knife along dashed line 86 around the entire periphery of the sleeve and the forwardmost portion 88 of the sleeve may be pulled to the right, as seen in FIG. 2, to remove the forwardmost three sections 60F of the sleeve along with the forwardmost portion 80F of the sheath. It is noted that in so doing, a forward portion 90 (see FIGS. 3, 6 and 7) of the sheath 80 which corresponds to the portion of the third section 60F which had been located to the left of the surface 56 of masonry wall 52, is left behind and serves as a retaining wall which assures that the opening to the electrical outlet box is flush with the surface 56 of the masonry wall 52. It will be apparent that by first troweling mortar up to the sleeve and then cutting the sheath to remove the excess portion of the sleeve which projects beyond the surface of the masonry wall, a perfect flush fit may be obtained. The sheath 80 may be cut at any location along the length of the sleeve 30 so that a flush opening is always obtained regardless of the thickness of the masonry wall and the exact location of the electrical outlet box within the wall. Thus, the raised cover is adjusted to the surface of the wall after the wall is completed and patched and need not be adjusted before the wall is completed. Additionally, sheath 80 serves as a trim for a neater finished surface.

The plastic material may be chosen from among those synthetic resin materials which are at least semi-rigid and which will provide the requisite structural strength necessary to hold the sections in place. In addition, the plastic material should be rigid enough to serve as a retaining wall when some of the sections are removed from within the sheath as explained above. Also, the plastic material must be easily cut to provide the flush opening as outlined above. Such thermoplastic synthetic resins as polyethylene, polypropylene, polyvinylchloride, some of the polyamides and some of the polycarbonates have been found to be suitable. Other suitable synthetic resin materials will be apparent to those skilled in the art of materials.

Upon completion of the wall 52 and the removal of the excess length of sleeve 30 as described above, each of the two clips 48 may be positioned within the forwardmost of the remaining sections 60 as seen in FIGS. 3, 6 and 7. Each clip 48 is provided with a resilient tongue 92 which projects upwardly out of the plane of the base 94 of the clip. The base 94 of the clip is slipped into the channel 72 provided by the raised portion 70 of the strap member 62 and, as the base 94 is advanced to the left as seen in FIGS. 3 and 7, the resilient tongue 92 will be depressed until the tongue passes beyond the rearmost edge 96 of the portion 70, at which point the tongue 92 will spring upwardly to lock the clip 48 in place against removal by movement to the right. The vertical leg 98 of each clip 48 carries a screw fastener 100 and the screw fasteners 100 are then employed to hold an external cover plate 102 in place over the opening to the electrical outlet box or an appliance within the box in a conventional manner. Prior to the installation of clips 48 as described above, the clips are conveniently kept from becoming misplaced or lost by having the bond wire, or ground wire 42 pass through the clips 48, as shown in FIG. 1, such that the ground wire serves as a retainer for the clips. After installation of the clips, the ground wire is employed to ground the appliance which is to be installed within the electrical outlet box, as required by the present regulations for electrical installations.

Thus, it will be seen that the sleeve with is composite construction which includes an outer sheath of plastic material and an inner structure of colligated sections provides a receptacle of infinitely variable length or depth rather than a plurality of fixed length or depths as has been the practice in the past. The sleeve provides a positive retaining wall against which a mason may trowel a finishing material to assure that the surface of the finished wall will be brought into flush relationship with the opening to the receptacle and the opening is rendered flush with the wall subsequent to installation and to finishing of the wall.

Referring now to FIG. 8, a receptacle 110 is shown and has a construction made in accordance with the invention. Receptacle 110 includes a body 112 in the form of a box having side walls 114, a closed bottom 116 and an open end 118.

A sleeve 120 extends forwardly from the open end 118 of the receptacle to establish an extension of the side walls 114, the sleeve 120 including a plurality of sleeve-like sections 122 each having sides 124 corresponding to side walls 114.

As in the earlier described embodiment, the sections 122 are arranged in end-to-end relationship along a longitudinal axis and are aligned longitudinally in such arrangement by tabs 126 which project rearwardly from each section to overlap and engage corresponding forwardmost portions of an adjacent section.

A sleeve-like layer of plastic material in the form of a sheath 130 is coextensive with the sections 122 and cooperates with the sections such that the sheath may be severed flush with the surface of the surrounding structure in which the receptacle 110 will be installed to remove the forwardmost portion of the sheath extending forward of the surface of the surrounding structure and to remove any sections which correspond to the forwardmost portion of the sheath and which extend forward of the surface of the surrounding structure so as to render the opening to the receptacle flush with the surface of the surorunding structure as set forth in detail in connection with the description of the embodiment of FIGS. 1 through 7.

Thus, each section 122 is also provided with notches 132 at the juncture with an adjacent section to enable the plastic material of sheath 130 to project into notches 132 and lock each section 122 in place within the sleeve 120. In addition, the sheath 130 extends over the side walls 114 and the walls 114 are provided with apertures 134 through which projections 136 of the sheath 130 are passed in order to secure the sleeve 120 to the side walls 114 of body 112. Alternate means may be provided for securing the sleeve 120 to the body 112. For example, the sheath of plastic material may be made to extend around at least a portion of the bottom 116 of the body, or the tabs projecting from the rearmost section 122 could be mechanically secured to the side walls 114.

Upon severing the sheath 130 at any location along the length of the sheath, the portion of the sleeve forward of the location may be removed to render the forward edge of the remainder of the sleeve flush with a surrounding structure.

It is to be understood that the above detailed description of embodiments of the invention is provided by way of example only. Various details of design and construction may be modified without departing from the true spirit and scope of the invention which is defined in the appended claims.

The embodiments of the invention in which an exclusive property or privilege is claimed are defined as follows:

1. A cover for an electrical box, the cover having an opening which is to be flush with the surface of the surrounding structure within which the electrical box is to be located, said cover comprising:
   a sleeve extending from a rearmost end adjacent the box to a forwardmost end adjacent the opening and including
   a plurality of sleeve-like sections arranged longitudinally in end-to-end relationship between the ends of the sleeve and including at least one forward section adjacent the opening; and
   a sleeve-like layer of plastic material coextensive with the sections and cooperating with the sections such that the sleeve-like layer may be severed flush with the surface of the surrounding structure to remove the forwardmost portion of the layer extending forward of the surface of the surrounding structure and any sections which correspond to said forwardmost portion of the layer and which extend forward of said surface of the surrounding structure and render said opening flush with said surface of the surrounding structure.

2. The cover of claim 1 wherein each section includes at least one protrusion projecting longitudinally toward the next adjacent section and engaging a portion of said next adjacent section to align adjacent sections along a longitudinal axis.

3. The cover of claim 1 wherein:
   each section includes at least one transverse surface portion; and
   the sleeve-like layer includes a portion corresponding to each said transverse surface portion and extending transversely along said transverse surface portion to retain each section in place within said sleeve.

4. The cover of claim 1 wherein:
   the sections extend longitudinally along an axis generally perpendicular to the opening and are located within the sleeve-like layer, the sections having outer, longitudinally extending surfaces; and
   the sleeve-like layer comprises a sheath which surrounds the outer longitudinally extending surfaces of the sections.

5. The cover of claim 4 wherein said sleeve includes a passage passing transversely into the sections at each juncture between adjacent sections and the sheath includes projections corresponding to such passages and extending into said passages to releasably retain each section in place within said sleeve.

6. In a receptacle having an opening, the edge of which opening is to be flush with surrounding structure within which the receptacle is to be located, a sleeve extending from a rearmost end to a forwardmost end adjacent the opening, said sleeve comprising:
   a plurality of sleeve-like sections arranged longitudinally in end-to-end relationship between the ends of the sleeve and including at least one forward section adjacent the opening; and
   a sleeve-like layer of plastic material coextensive with the sections and cooperating with the sections such that the sleeve-like layer may be severed flush with the surface of the surrounding structure to remove the forwardmost portion of the layer extending forward of the surface of the surrounding structure and any sections which correspond to said forwardmost portion of the layer and which extend forward of said surface of the surrounding structure and render said opening flush with said surface of the surrounding structure.

7. The receptacle of claim 6 wherein each section includes at least one protrusion projecting longitudinally toward the next adjacent section and engaging a portion of said next adjacent section to align adjacent sections along a longitudinal axis.

8. The receptacle of claim 6 wherein:
   each section includes at least one transverse surface portion; and
   the sleeve-like layer includes a portion corresponding to each said transverse surface portion and extending transversely along said transverse surface portion to retain each section in place within said sleeve.

9. The receptacle of claim 6 wherein:
the sections extend longitudinally along an axis generally perpendicular to the opening and are located within the sleeve-like layer, the sections having outer, longitudinally extending surfaces; and
the sleeve-like layer comprises a sheath which surrounds the outer longitudinally extending surfaces of the sections.

10. The receptacle of claim 9 wherein said sleeve includes a passage passing transversely into the sections at each juncture between adjacent sections and the sheath includes a projection corresponding to such passages and extending into said passages to releasably retain each section in place within said sleeve.

References Cited

UNITED STATES PATENTS

| | | | |
|---|---|---|---|
| 848,888 | 4/1907 | Erickson | 220—3.7 |
| 2,288,377 | 6/1942 | Tuttle | 220—3.7 X |
| 2,989,206 | 6/1961 | McAfee | 220—3.7 |

JOSEPH R. LECLAIR, Primary Examiner

J. R. GARRETT, Assistant Examiner